United States Patent
Schott et al.

(10) Patent No.: US 10,472,689 B2
(45) Date of Patent: Nov. 12, 2019

(54) METHOD FOR BLOWING SUBSTITUTE REDUCING AGENTS INTO A BLAST FURNACE

(71) Applicant: KÜTTNER HOLDING GMBH & CO. KG, Essen (DE)

(72) Inventors: Robin Schott, Krefeld (DE); Christian Bartels-Freiherr Varnbüler von und zu Hemmingen, Düsseldorf (DE)

(73) Assignee: Küttner Holding GmbH & Co. KG, Essen (DE)

( * ) Notice: Subject to any disclaimer, the term of this patent is extended or adjusted under 35 U.S.C. 154(b) by 100 days.

(21) Appl. No.: 15/504,372

(22) PCT Filed: Jul. 3, 2015

(86) PCT No.: PCT/EP2015/065207
§ 371 (c)(1),
(2) Date: Feb. 16, 2017

(87) PCT Pub. No.: WO2016/026604
PCT Pub. Date: Feb. 25, 2016

(65) Prior Publication Data
US 2017/0234619 A1 Aug. 17, 2017

(30) Foreign Application Priority Data
Aug. 18, 2014 (DE) .................. 10 2014 216 336

(51) Int. Cl.
*C21B 7/16* (2006.01)
*B65G 53/16* (2006.01)
(Continued)

(52) U.S. Cl.
CPC .............. *C21B 7/163* (2013.01); *B65G 53/16* (2013.01); *C10J 3/723* (2013.01); *C21B 5/001* (2013.01);
(Continued)

(58) Field of Classification Search
CPC . C21B 5/001; C21B 5/10; C10J 3/723; B65G 53/16
See application file for complete search history.

(56) References Cited

U.S. PATENT DOCUMENTS

| 3,236,629 A | 2/1966 | Agarwal et al. |
| 4,758,118 A | 7/1988 | Rachner et al. |
| (Continued) | | |

FOREIGN PATENT DOCUMENTS

| CA | 2776548 A1 * | 4/2011 |
| CN | 101000141 A | 7/2007 |
| (Continued) | | |

OTHER PUBLICATIONS

Schott, Hans-Klaus. "The Kuettner Dense Phase Method," translated from "Das Kuettner Dichtstromverfahren." Steel & Metals Magazine. 27:4 pp. 272-277. (Year: 1989).*
(Continued)

*Primary Examiner* — Tima M. McGuthry-Banks
(74) *Attorney, Agent, or Firm* — Westerman, Hattori, Daniels & Adrian, LLP

(57) ABSTRACT

The present invention relates to a method for pneumatically blowing a powdery substitute reducing agent in a dense flow process, by means of a transport gas, into a gasification reactor, or via a tuyere into a blast furnace. The substitute reducing agent is gasified in a gasification reaction. The transport gas comprises a fuel gas, the constituents of which or the oxidation constituents of which are at least partly involved in the gasification reaction.

20 Claims, 3 Drawing Sheets

(51) Int. Cl.
*C10J 3/72* (2006.01)
*C21B 5/00* (2006.01)
(52) U.S. Cl.
CPC ............... *C21B 5/003* (2013.01); *C21B 7/16* (2013.01); *C21B 2005/005* (2013.01)

(56) References Cited

U.S. PATENT DOCUMENTS

| | | | |
|---|---|---|---|
| 6,231,638 | B1 | 5/2001 | Janz et al. |
| 2015/0184939 | A1 | 7/2015 | Nakagawa et al. |

FOREIGN PATENT DOCUMENTS

| | | | |
|---|---|---|---|
| CN | 102060197 | A | 5/2011 |
| CN | 102382915 | A | 3/2012 |
| CN | 102605119 | A | 7/2012 |
| DE | 27 02 022 | A1 | 7/1977 |
| DE | 225 447 | A1 | 7/1985 |
| DE | 3603078 | C1 | 10/1987 |
| DE | 4008963 | C1 | 11/1991 |
| DE | 196 06 575 | A1 | 8/1997 |
| DE | 19859354 | A1 | 7/2000 |
| DE | 103 56 480 | A1 | 7/2005 |
| DE | 21 2007 000 007 | U1 | 9/2008 |
| DE | 102007020294 | A1 | 11/2008 |
| EP | 0 059 904 | A1 | 9/1982 |
| EP | 0 319 505 | B1 | 3/1992 |
| EP | 2407742 | A1 | 1/2012 |
| EP | 2653565 | A1 * | 10/2013 |
| EP | 2796566 | A1 | 10/2014 |
| FR | 2 452 520 | A1 | 10/1980 |
| JP | 62-142706 | A | 6/1987 |
| JP | 4-202708 | A | 7/1992 |
| JP | 4-202709 | A | 7/1992 |
| JP | 6-94564 | A | 4/1994 |
| JP | 6-94564 | B2 | 11/1994 |
| JP | 11-92809 | A | 4/1999 |
| JP | 2002-522639 | A | 7/2002 |
| JP | 2003-286511 | A | 10/2003 |
| JP | 2011-174171 | A | 9/2011 |
| KR | 2001-00102744 | A | 2/2001 |
| SU | 1103799 | A3 | 7/1984 |
| SU | 1157061 | A1 | 5/1985 |
| TW | 201231884 | A | 8/2012 |
| UA | 18362 | A | 12/1997 |
| UA | 18362 | U | 11/2006 |
| WO | 81/02584 | A1 | 9/1981 |
| WO | 2013/094230 | A1 | 6/2013 |
| WO | 2014/045876 | A1 | 3/2014 |

OTHER PUBLICATIONS

International Search Report dated Oct. 8, 2015, issued in counterpart International Application No. PCT/EP2015/065207 (3 pages, including annex).
Written Opinion dated Oct. 8, 2015, issued in counterpart International Application No. PCT/EP2015/065207 (6 pages).
Babich, A. et al, "Co-injection of Noncoking Coal and Natural Gas in Blast Furnace", ISIJ International, 1999, vol. 39, No. 3, pp. 229-238.
English translation of Office Action dated Jul. 11, 2017, issued in counterpart Japanese Application No. 2017-518433. (3 pages).
Schott, Robin: "Verbesserte Technik zum Einblasen von Kohlenstaub in den Hochofen", Stahl und Eisen, 133 (2013) Nr. 1; pp. 49-62.
Schulte, van Bentheim, Michael, "Results of Dense Phase Pulverised Coal Injection System", Proceedings of the 5th International Congress on the Science and Technology of Ironmaking, 2009, pp. 822-824.
Supplemental Invalidation Brief dated Aug. 29, 2019, issued in counterpart TW Application No. 1041268886N01, with English translation (16 pages).

* cited by examiner

200

METHOD FOR BLOWING SUBSTITUTE REDUCING AGENTS INTO A BLAST FURNACE

TECHNICAL FIELD

The present invention concerns a method for pneumatically blowing a powdery substitute reducing agent in the dense flow process, by means of a transport gas, into a gasification reactor or via a tuyere into a blast furnace, such that the substitute reducing agent is gasified in a reaction. According to a further aspect, the invention concerns such a method wherein the substitute reducing agent is blown with the transport gas through a first injection lance which, in addition to the substitute reducing agent and transport gas, also supplies oxygen which is combined with the substitute reducing agent and the transport gas in an opening region of the injection lance. Furthermore, the present invention concerns a device for performance of such a method.

PRIOR ART

It is known for example from "stahl and eisen" [Steel and Iron] 133 (2013) no. 1, p. 49-62, and in principle it is normal, in crude iron production in a blast furnace, to supply liquid, gaseous and/or solid substitute reducing agents or fuels to the blast furnace process via the tuyeres (also: blast pipes) with the purpose of replacing comparatively costly blast furnace coke. In the present text, the term "substitute reducing agents" is used uniformly to cover all reducing agents and also carbon-containing fuels such as coal. Solid substitute reducing agents, in the context of the present invention, may comprise not only coal and coke dust but also comminuted plastic waste, such as described for example in DE 198 59 354 A1. Here it is particularly important that as far as possible, no solid particles can penetrate the coke bulk, since otherwise interruptions to the gasification and hence the processes of the blast furnace can result. Frequently, the substitute reducing agent is injected through an injection lance into the blast furnace via the tuyere. The hot blast forms an eddy zone in which the injected substitute reducing agent mixes with the hot blast of the tuyere. To prevent solid particles from being able to penetrate the coke bulk, the entire injected solid substitute reducing agent must be gasified in the flight phase after emergence from the injection lance and before the end of the eddy zone, i.e. before it can hit the coke bulk.

In the present context, the term "gasify" means an incomplete combustion from which preferably CO and/or $H_2$ result. In contrast, "combustion" means a full combustion which leads for example to $CO_2$ and $H_2O$. Since CO and $H_2$ are particularly useful for the blast furnace process, the purpose of injecting substitute reducing agents is a gasification reaction, the reaction products from which can lead to a saving in particularly very costly coke fuel.

In the region of the gasifying reactors, the purpose of the gasification reaction is normally the production of a reduction gas which is obtained as a product from the gasification reactor. In the blast furnace process however, reduction gas is used to obtain crude iron as iron ore.

In the known fashion, a carbon-containing powdery substitute reducing agent, such as for example coal dust, is supplied pneumatically in the dense flow or flight flow process by means of nitrogen as an inert transport gas, to the tuyeres of the blast furnace via one or more transport lines, such as described in particular in "STEEL & METALS Magazine", Vol. 27. no. 4, 1989, p. 272-277 and DE 36 03 078 C1. Here, the substitute reducing agent is injected either by means of at least one single injection lance protruding into the tuyere and consisting of a pipe, or by means of at least one coaxial injection lance protruding into the tuyere, using oxygen.

"Chemie Ingenieur Technik" [Chemical Engineering] 84 (2012), no. 7, p. 1076-1084 describes for example a coaxial injection lance, consisting preferably of a coal-transporting inner pipe and an outer pipe surrounding the inner pipe concentrically, forming a ring gap. The oxygen is conducted through the ring gap, as also described in DE 40 08 963 C1.

Furthermore, it is known from JPH-1192809 (A), instead of a single coaxial injection lance, to use an injection lance consisting of three pipes nested inside each other, wherein the coal dust is conducted through the inner pipe, oxygen through the coaxial gap between the inner pipe and the pipe surrounding the inner pipe, and steam or a steam-carbon dioxide mixture through the second coaxial gap between the second pipe and the third pipe surrounding the second pipe.

The transport gas used is always pure nitrogen which is inert and hence advantageous with regard to explosion protection inside the delivery and injection system, and also easily available usually in blast furnace plants.

In addition, CN 101000141(A), CN 102382915(A) and CN 102060197(A) describe that, to the greatest extent, inert waste gases or carbon dioxide may be used instead of nitrogen as a transport gas for pneumatic delivery and injection of coal dust. The purpose of these ideas is to improve environmental protection and save energy. In these cases, either exhaust gas from a hot blast burner or carbon dioxide as pure as possible is used.

Furthermore, it is known from other areas of the art that, on production of synthetic gases by coal dust pressure gasification, pure carbon dioxide or a mixture of carbon dioxide and nitrogen is supplied to the pneumatic coal dust transport system as a medium for rendering inert, and as a fluidization and transport medium. Reference is made in this context for example to DE 10 2007 020 294 A1.

Insofar as nitrogen is used as a transport gas, the disadvantage exists that nitrogen has a reaction-inhibiting and delaying effect on the gasification reaction of the substitute reducing agent. Since the particles of the substitute reducing agent are encased in nitrogen, the reaction can only begin when the nitrogen has been displaced. This leads to a delay in reaction and hence to a shortening of the time available for reaction in relation to the flight time of the substitute reducing agent, after this has left the injection lance.

The very short reaction times of just a few milliseconds, available for gasification of the substitute reducing agent on injection into the tuyere and the eddy zone of the blast furnace, illustrate that important reaction time is lost by the use of nitrogen as an inert transport gas, and the possible gasification potential of the substitute reducing agent when injected into the blast furnace is not utilized to the optimum.

When carbon dioxide is used as a transport gas, the inhibition of the reaction is less observed. However, the methods known from the prior art for the use of carbon dioxide as a transport gas, compared with the use of nitrogen, are comparatively complex and therefore disadvantageous. Also, carbon dioxide cannot bond optimally into the gasification process of the substitute reducing agent, since a comparatively large quantity of energy must be supplied in order for the carbon dioxide to participate in a reaction with the substitute reducing agent.

DEPICTION OF THE INVENTION

The object of the invention as a whole is to structure the method of blowing substitute reducing agent into a gasification reactor, a blast furnace or another reactor such that the gasification reaction of the substitute reducing agent can take place effectively and as quickly as possible, in order thus to increase the achievable injection rate of substitute reducing agent into the reactor, in particular the blast furnace, while simultaneously reducing further the coke rate or fuel rate according to the exchange factor of coke/coal or fuel/substitute reducing agent, and overall to lower the fuel costs further.

This object is achieved according to the invention. Advantageous embodiments of the invention arise from the sub-claims.

According to a first aspect, the invention comprises the provision of a method for pneumatically blowing a powdery substitute reducing agent in the dense flow process, by means of a transport gas, into a reactor, in particular a gasification reactor, or via a tuyere into a blast furnace, so that the substitute reducing agent is gasified in a gasification reaction.

In connection with the present invention, the term "dense flow process" means the process as described in "STEEL & METALS Magazine", Vol. 27, no. 4, 1989, p. 272-277. In connection with the present invention, the dense flow process is distinguished from the flight flow process by a high flow density of the powdery material of 60% or more, particularly preferably 80% or more, of the packing density in the bulk state. The flight flow process in contrast is operated at flow densities of less than 25%.

According to this aspect of the invention, the transport gas consists of a fuel gas, the components (e.g. $O_2$, $H_2O$ or $CO_2$) of which or their oxidation components (i.e. components which, before the gasification reaction, undergo an oxidation reaction, e.g. CO, $H_2$, $CH_4$) at least partially participate in the gasification reaction of the substitute reducing agent, and another gas or gas mixture. The other gas or gas mixture differs from fuel gas so that, according to this first aspect, the transport gas does not consist completely of fuel gas.

According to a further aspect of the invention, the transport gas is carbon monoxide, hydrogen, water vapor, oxygen, hydrocarbons or a mixture thereof, in particular natural gas, furnace gas, coke gas or coking plant gas, converter gas or another blast furnace gas or a mixture thereof, wherein according to this further aspect, the transport gas may also consist completely of fuel gas.

In principle, the transport gas must be considered on injection, i.e. in the composition with which it is injected into the gasification reactor or into the blast furnace via the tuyere.

The term "fuel gas" in the context of the present invention means a gas which, during gasification of the substitute reducing agent, itself comprises combustible components or components whose oxidation components participate in the gasification of the substitute reducing agent. Fuel gas comprises carbon monoxide, where applicable carbon dioxide, hydrogen, water vapor, oxygen, hydrocarbons or a mixture thereof, in particular natural gas, furnace gas, coke gas or coking plant gas, converter gas or other blast furnace gas, or a mixture thereof. The fuel gas leads to substantial acceleration of the gasification reaction of the substitute reducing agents, because the reaction forming the basis for the gasification has already been ignited early and more time is available for this than when the substitute reducing agent is encased in nitrogen. In many fuel gases, the use of the fuel gas in the transport gas in some cases allows the blast furnace process or other reaction process to be configured more efficiently. If for example a gas containing carbon is introduced as a fuel gas into a blast furnace during injection of the substitute reducing agent, this leads to a saving—albeit very limited—of expensive coke. Fuel gases in the sense of the present invention however—independently of a possible additional participation in the reaction process in the reactor, in particular in the blast furnace process—are gases which participate directly or indirectly in the gasification of the substitute reducing agent.

The supply of just 2 w. % fuel gas leads to a preferred earlier ignition and accelerated gasification of the substitute reducing agent, wherein an increase in the proportion of fuel gas in the transport gas may lead to a further increase in efficiency. As well as the proportion of fuel gas, the temperature and pressure in the vicinity of the injection point, in particular in the eddy zone, are important for the time of ignition. Depending on the prevailing conditions, it may be advantageous to increase the proportion of fuel gas further. Thus it is possible to inject more substitute reducing agent per time unit then when conventional nitrogen is used.

Preferably, the transport gas consists to at least 2 w. %, preferably at least 5 w. %, preferably at least 10 w. % of the fuel gas, wherein it is further preferred if the transport gas consists to maximum 90 w. %, further preferably maximum 50 w. %, further preferably maximum 25 w. %, further preferably maximum 20 w. % of the fuel gas. A preferred weight proportion of the fuel gas in the transport gas thus lies between 2 and 90%, further preferably between 2 and 50%, 2 and 25% or 2 and 20% further preferably between 5 and 90%, 5 and 50%, 5 and 25%, 5 and 20%, or 10 and 90%, 10 and 50%, 10 and 25% and particularly preferably between 10 and 20%.

Also, according to the first aspect of the invention, the transport gas consists of another gas or gas mixture than the fuel gas, wherein the other gas or gas mixture preferably comprises nitrogen. However, other gases as well as the fuel gas may be included in the transport gas. Preferably, it should be ensured that these other gases offer sufficient protection against explosion and have no disadvantageous effects on the blast furnace process and in particular on the gasification reaction of the substitute reducing agent.

In particular, in the context of the present invention, the following reactions should be regarded as gasification reactions of the substitute reducing agent (coal dust gasification reactions):

Oxidation of volatiles: $vol + O_2 \rightarrow CO + H_2 + N_2$

Partial coke burn-out: $C + \tfrac{1}{2}O_2 \rightarrow CO$

CO oxidation/dissociation of carbon dioxide: $2CO + O_2 \leftrightarrow 2CO_2$

Boudouard's reaction: $C + CO_2 \rightarrow 2CO$

Water gas reaction (heterogeneous): $C + H_2O \rightarrow CO + H_2$

Water gas reaction (homogeneous): $CO + H_2O \leftrightarrow CO_2 + H_2$

Oxyhydrogen reaction/dissociation of water vapor: $2H_2 + O_2 \leftrightarrow 2H_2O$ Natural gas reaction: $CH_4 + 2O_2 \rightarrow CO_2 + 2H_2O$ The invention, which in particular concerns a method for blowing carbon-containing, powdery substitute reducing agent or fuels into a gasification reactor or blast furnace, may be used in all areas of the technology, depending on their type, in processes which are advantageously influenced in relation to the method, energy or economy if the powdery substitute reducing agents or fuels used in the process are supplied to a reactor. This is because the advantageous influencing by the use of substitute reducing agents or fuels may be amplified due to the possible increase in the injection rate of the substitute reducing agent or fuel. The invention is therefore not restricted to a blast furnace or gasification reactor, but also concerns other such reactors. Such reactors may, in addition to the gasification reactor and blast furnace, comprise for example shaft or cupola furnaces, fluidized beds, hot gas generators and combustion chambers, where applicable with the assistance of electrical energy, for example SAF (submerged arc furnace) or EAF (electric arc furnace) plants. Gasification reactors and quite particularly blast furnaces are however preferred applications of the method according to the invention, because here a simple modification to existing plants may lead to a great increase in efficiency.

Preferably, the transport gas and the substitute reducing agent are blown in through at least one first injection lance which for this preferably protrudes into the tuyere or a corresponding chamber of the reactor or gas pipe. With such an injection lance, the substitute reducing agent and the transport gas can be mixed well with the hot blast. Alternatively however, it is also possible that the substitute reducing agent is injected with the transport gas via a simple opening in the tuyere.

Further preferably, oxygen gas or an oxygen-containing gas mixture may be injected into the reactor, in particular the blast furnace, such that the transport gas and the substitute reducing agent are combined with the oxygen or oxygen-containing gas mixture in the opening region of the first injection lance(s).

In an advantageous embodiment of the invention, the first injection lance preferably has an inner pipe and an outer pipe surrounding the inner pipe to form a ring gap, wherein the substitute reducing agent together with the transport gas is conducted through the inner pipe, and the oxygen or oxygen-containing gas mixture is conducted through the ring gap.

In this way, the injected substitute reducing agent is encased by pure oxygen or an oxygen-containing gas directly after emerging from the first injection lance. In this way, the reaction partners important for the gasification reaction—namely oxygen, the substitute reducing agent and the fuel gas contained in the transport gas—are combined at the interface, important for the start of reaction, between the injection jet of the substitute reducing agent and the transport gas and oxygen, in the opening region of the first injection lance.

The necessary reaction energy is provided firstly by the back flow from the reaction chamber of the reactor, in particular the blast furnace, and secondly by the gasification reaction itself which then begins. Here, in particular, a fuel gas is preferred which requires as little energy as possible for igniting the gasification reaction. In this context, carbon monoxide and hydrogen are advantageous compared with carbon dioxide and water vapor, because they require a lower temperature to ignite the gasification reaction.

According to an alternative advantageous embodiment, the first injection lance consists of a single pipe, through which the substitute reducing agent is conducted together with the transport gas. Oxygen or oxygen-containing gas is then supplied preferably via a differently conducted route, e.g. via an additional gas lance, a second injection lance, or via the route of the hot blast through the tuyere, to the substitute reducing agent inside the tuyere.

In this way again, all reaction partners of the gasification reaction can be merged in the opening region of the injection lance, although the advantageous embodiment described above with concentric pipes allows a more easily controllable and more efficient supply of substitute reducing agent, transport gas and oxygen.

According to a second aspect of the invention, this concerns a method for pneumatically blowing a powdery substitute reducing agent in the dense flow process, by means of a transport gas, into a reactor, in particular a gasification reactor, or via a tuyere into a blast furnace, so that the substitute reducing agent is gasified in a gasification reaction, wherein the substitute reducing agent is blown in with the transport gas through a first injection lance, wherein in addition to the substitute reducing agent and transport gas, oxygen is also supplied to the reactor through the first injection lance and is combined with the substitute reducing agent and transport gas in an opening region of the first injection lance. Here the first injection lance preferably has an inner first pipe and a second pipe arranged around this, whereby a ring gap surrounding the first pipe is formed between the first and second pipes, wherein the substitute reducing agent and the transport gas are conducted through the first pipe and the oxygen is conducted through the ring gap. Here, according to this aspect; the transport gas comprises a fuel gas, the components of which or their oxidation components participate at least partially in the gasification reaction. In the method according to the second aspect of the present invention, the energy threshold required for ignition is lowered in comparison with the general method described above, in that the fuel gas comes into contact with the oxygen immediately. In this case for example, water vapor or carbon dioxide also be used efficiently as a fuel gas.

In the case of the additional supply of oxygen via the second pipe forming the ring gap, a particularly good gasification of the substitute reducing agent is possible.

Preferably, several first injection lances may be used. Alternatively and additionally, preferably several second injection lances may be used. Several first and/or second injection lances may be provided in one tuyere or in several tuyeres.

It is also advantageous if the flow of the supplied oxygen or oxygen-containing gas and/or the supplied substitute reducing agent is mixed or eddied in the opening region of the first injection lance. For this, it is preferred that a mixing of the substitute reducing agent and transport gas with oxygen is promoted by an eddy structure.

Turbulence in the reaction chamber ensures an even better mixing of the reaction partners, which leads to an even faster and more effective gasification of the injected substitute reducing agent.

For this, the first injection lance preferably has an eddy structure which promotes the mixing of the substitute reducing agent and fuel gas with the oxygen in the opening region of the first injection lance. Such an eddy structure is for example an arrangement of guide plates in the region of the opening of the first injection lance. Other eddy structures are also possible which cause eddying of the substitute reducing agent or hot blast instead of or in addition to the oxygen. Such structures are in principle independent of an injection lance, but may be used particularly efficiently however in conjunction with the injection lance.

The present invention, in particular in its preferred embodiments, avoids the reaction-inhibiting and delaying effect of the nitrogen inert transport gas, previously used on the gasification reaction of the substitute reducing agent. This accelerates the speed of the gasification reaction of the substitute reducing agent. This effect may be further amplified by the additional use of pure oxygen or an oxygen-containing gas mixture supplied to the opening region of the injection lance, and the reaction speed may be accelerated further. A further important basis for accelerating the gasification reaction is the early ignition of the injected substitute reducing agent directly after leaving the injection lance, for example in the hot blast flow from the blast furnace. To achieve this, in a targeted fashion, the physical circumstance is exploited that the coating of the injected substitute reducing agent with oxygen or oxygen-containing gas mixture is diathermanous, whereas the transport gas absorbs radiation. As a result, the heat radiation from the reactor, for example from the hot blast, the tuyere wall and from the eddy zone of the blast furnace, penetrates almost unhindered through the oxygen coating, and the energy required for ignition of the substitute reducing agent is emitted at the interface of the oxygen and the substitute reducing agent plus fuel gas. The energy which may be used for ignition of the substitute reducing agent is thus emitted directly at the correct location, namely at this interface, to the dust-like particles of the substitute reducing agent and the fuel gas participating in the gasification reaction, because of the radiation absorption taking place there.

Because the period required for gasification of the substitute reducing agent remains the same on injection into the reactor, in particular into the tuyere and eddy zone of the blast furnace, as a whole the invention and in particular its preferred embodiments lead to an increase in the maximum possible injection rate, with a simultaneous fall in the coke rate according to the coke/coal exchange factor, and hence a fall in the fuel costs of the blast furnace operation.

A further preferred embodiment of the method consists of the supplied substitute reducing agent and/or transport gas and/or preferably supplied oxygen or oxygen-containing gas being pre-heated to temperatures of between 100° C. and 950° C.

By preheating the reaction partners, the gasification of the substitute reducing agent is further accelerated since the heating period, after injection of the reaction agents into the reaction chamber (tuyere and eddy zone), is omitted and hence the gasification reactions as a whole take place more quickly, which allows a further increase in the injection rate of convertible substitute reducing agents.

It is furthermore preferred that the charge of transport gas with substitute reducing agents on injection into the reactor, in particular the blast furnace, can be varied within wide limits and adjusted depending on the reaction. By varying the ratio of quantity of substitute reducing agent to quantity of fuel gas, a ratio can be set which is optimum for the gasification of the substitute reducing agent and may vary as a function of the respective operating state of the reactor, in particular the blast furnace or gasification reactor, their individual configuration, the raw materials used and the ambient conditions.

For the method according to the invention, it is furthermore advantageous if the outlet speed and/or the injection quantity of substitute reducing agent and/or where applicable the outlet speed and/or quantity of oxygen from the injection lance, can be varied within wide limits and adjusted depending on the reaction. In this way, alternatively and additionally to the variation described above of the charge of transport gas with substitute reducing agent, an optimum ratio may be set for the gasification reaction of the substitute reducing agent in combination with the fuel gas and where applicable the oxygen, which may vary depending on the respective operating state of the reactor, in particular the blast furnace or gasification reactor. This means in particular that the outlet speed and/or the quantity of oxygen may be changed taking into account the reaction at a preset outlet speed and/or quantity of oxygen, in order to set optimal parameters for the gasification reaction of the substitute reducing agent.

Depending on the design of the reactor, for example the blast furnace, in particular the tuyere and injection mechanism, or of the gasification reactor, and depending on the fuel gas used, it is possible to visually optimize the charge of transport gas, i.e. the mass flow ratio between the fuel gas and substitute reducing agent. When the substitute reducing agent reacts together with the fuel gas, in particular on supply of oxygen to the reaction chamber, a light phenomenon occurs. Enough substitute reducing agent may be supplied for this light phenomenon to be extinguished. In order to maximize the quantity of substitute reducing agent to be supplied, the supplied quantity of fuel gas and/or where applicable oxygen, but also the outlet speed of the substitute reducing agent, fuel gas and/or oxygen, may be adjusted so that the light phenomenon is observed at as high a supplied quantity as possible of substitute reducing agent.

In embodiments in which a light phenomenon does not occur or cannot be observed, in principle it is possible, using the operating parameters of the reaction process, in particular the blast furnace process, to find an optimum for the settings that are necessary for a maximum supplied quantity of substitute reducing agent, for the supplied quantity of fuel gas and/or oxygen and the outlet speed of the substitute reducing agent, fuel gas and/or oxygen.

Preferably, the fuel gas consists of natural gas, furnace gas, coke gas or coking plant gas, converter gas or another furnace gas or a mixture thereof. Above all, furnace gas and coke gas are fuel gases which are easily available in large quantities in the vicinity of a blast furnace plant, and are particularly suitable as fuel gases for this reason. Also, these gases contain large proportions of components which themselves or via their oxidation components participate in the gasification reaction of the substitute reducing agent.

In particular, carbon dioxide and water vapor impose increased requirements on reaction conditions for their use as fuel gas. These components have a higher energy requirement than for example carbon monoxide or hydrogen, for dissociating the oxygen proportion from these molecules and thus creating a gaseous environment favorable for gasification of the substitute reducing agent. Therefore these fuel gases are preferably used when additional oxygen is supplied in as high a concentration as possible, in particular in the region of the opening of the injection lance where present.

As a whole, the method according to the invention, particularly in its preferred embodiments, leads to an improvement of the blast furnace process or the processes concerned, in relation to the method, energy and economics.

A device according to the invention for performance of a method as described above comprises an injection lance for blowing the substitute reducing agent into the reactor, in particular into the gasification reactor or tuyere of a blast furnace, a vessel for receiving the transport gas and/or substitute reducing agent, and a transport line for supplying the substitute reducing agent from the vessel to the injection lance. The device is characterized in that it furthermore comprises a fuel gas supply via which a fuel gas can be supplied to the transport gas upstream of the injection lance.

The device according to the invention thus has a fuel gas supply through which, in addition to another gas for the transport of the substitute reducing agent, the fuel gas can be supplied to the transport gas in a definable weight proportion. This fuel gas supply is arranged in the region upstream of the injection lance, so that through the injection lance, the transport gas and fuel gas can be injected into the reactor, in particular into the tuyere of the blast furnace or the gasification reactor. In principle, it is possible to supply the fuel gas to the transport gas at any point along the transport line upstream of the injection lance or in the vessel. The closer the fuel gas supply is arranged to the injection lance, the more favorable the arrangement in relation to safety considerations. Also, the pressure necessary for supply is lower, the closer the supply takes place to the injection lance. Preferably, the fuel gas supply is arranged on the transport line, and particularly preferably, a distance along the transport line from the fuel gas supply to the injection lance is smaller than a distance along the transport line to the vessel in which the substitute reducing agent, where applicable with another gas of the transport gas, is stored. Advantageously, the fuel gas supply is arranged directly before the injection lance. Further preferably, in a transport pipe system with distribution device, the fuel gas supply is arranged downstream of the distribution device.

Further features and advantages of the invention arise from the claims in their entirety and from the following description of the figures.

WAYS OF IMPLEMENTING THE INVENTION

Figure 1A:
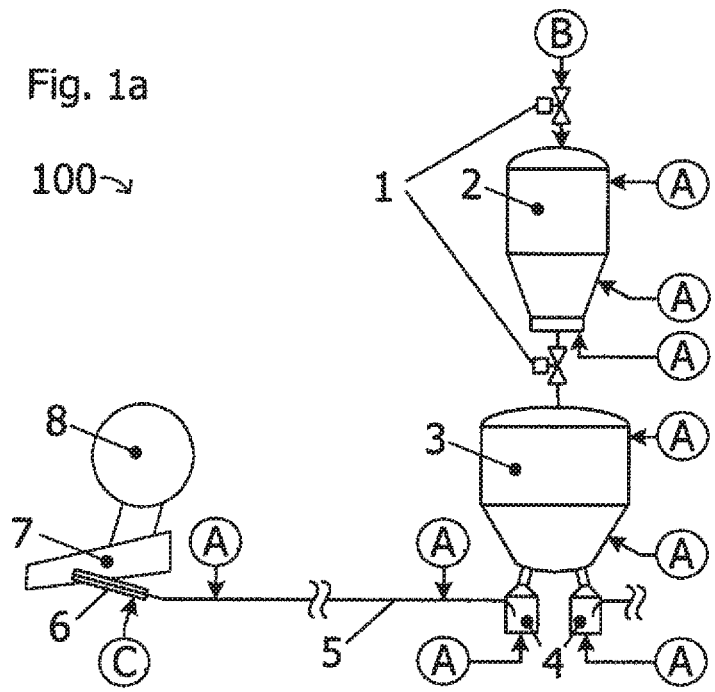
FIGS. 1a to 1c depict diagrammatically a preferred injection plant for a blast furnace and some details of such an injection plant.

The same or corresponding elements are identified in the description of the figures below by the same reference numerals and are only described once. In principle, features described in connection with one embodiment may also be implemented in another embodiment. This applies in particular to the arrangement and configuration of elements influencing flow, such as valves, chokes or distributors, and for the configuration of the mechanism for injecting the substitute reducing agent into the tuyere.

FIG. 1a is a diagrammatic depiction of a preferred injection plant 100. The injection plant 100 comprises a tuyere 7 via which the hot blast from a blast ring 8 can be injected into a blast furnace. Arranged in the tuyere 7 is an injection lance 6, preferably configured as a coaxial dust and gas injection lance, through which at the same time a first flow of substitute reducing agent and transport gas containing a fuel gas, and a second flow comprising oxygen or an oxygen-containing gas, can be supplied to the hot blast in the dense flow process.

In the embodiment depicted, the injection lance 6 is connected to an individual transport line 5 through which the substitute reducing agent can be transported from an injection vessel 3 via a fluidization vessel 4 to the injection lance 6. Preferably, a blast furnace plant may comprise several injection lances 6, individual transport lines 5 and in some cases also fluidization vessels 4, in order to inject as large a quantity as possible of substitute reducing agent into the blast furnace, distributed as evenly as possible.

Upstream of the injection vessel 3 in the depiction in FIG. 1a is a pressure lock 2, through which the pressurized injection vessel 3 is supplied optionally with substitute reducing agent which can then be topped up. For example, the pressure lock 2 may be filled under ambient pressure with coal dust or another substitute reducing agent, the pressure lock 2 may then be brought to the delivery pressure of the injection vessel 3, and then the substitute reducing agent introduced into the injection vessel 3. To control this, in FIG. 1a a shut-off valve 1 is arranged upstream and downstream of the pressure lock 2, wherein the valves mentioned as examples in the present description, and other flow-influencing elements may also be supplemented, modified, replaced and partly also omitted.

FIG. 1a shows at points marked "A" locations at which for example transport gas and/or fuel gas may be introduced into the system. At the point marked "B", upstream of the first shut-off valve 1 in the embodiment outlined in FIG. 1a, the substitute reducing agent or fuel may be introduced into the system.

In the region of the points marked "A" of the individual transport line 5, preferably a fuel gas may be added to the transport gas so that the transport gas consists for example to at least 2 w. % of fuel gas, the components of which or their oxidation components participate at least partially in a gasification reaction of the substitute reducing agent in the tuyere 7 and the blast furnace. The fuel gas may be introduced into the system preferably at one or both of the points marked "A" on the individual transport line 5, so that the transport gas downstream of this point consists to at least 2 w. % of fuel gas and the remainder of another gas or gas mixture, and hence leads to a particularly efficient injection of the substitute reducing agent in relation to its subsequent gasification.

At the point marked "C" directly upstream of the injection lance 6, in the embodiment shown in FIG. 1a, it is provided that the injection lance 6 is supplied with oxygen. In the embodiment shown in FIG. 1a, the injection lance 6 is preferably configured such that the substitute reducing agent with the transport gas, which comprises at least 2 w. % fuel gas, is introduced into the tuyere 7 through a central pipe which is surrounded by a ring gap, through which oxygen or an oxygen-containing gas is injected into the tuyere 7 as a casing flow of the transport gas.

Such a configuration of the injection lance 6 leads to a particularly efficient gasification reaction, which thus proceeds particularly quickly and begins particularly early, and hence allows the addition of a particularly large quantity of substitute reducing agent and the saving of a particularly large quantity of high-quality and expensive blast furnace coke.

Figure 1B:
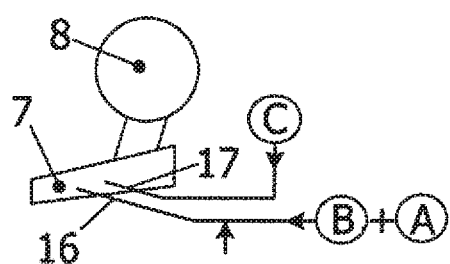

FIG. 1b shows an alternative embodiment of the injection mechanism which comprises a single dust injection lance 16 and a single gas injection lance 17. The substitute reducing agent with transport gas is injected into the tuyere 7 via the dust injection lance 16, and the oxygen is injected via the gas injection lance 17.

Preferably, immediately before the single dust injection lance 16, the fuel gas is supplied to the substitute reducing agent and transport gas at the point marked "A". However it is also possible that the fuel gas is already contained in the supply system and the substitute reducing agent is conveyed by the transport gas, which already partially or completely contains the fuel gas, substantially further upstream of the point shown in FIG. 1b.

Figure 1C:
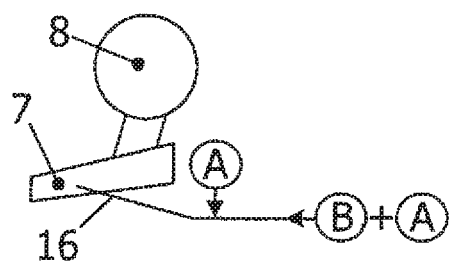

FIG. 1c illustrates a further preferred embodiment in which only a single dust injection lance 16 is provided, while no guided injection of oxygen is provided. Oxygen may here be supplied by a corresponding enrichment of the hot blast via the blast ring 8, or taken from the hot blast without separate enrichment, in order to perform the gasification reaction of the substitute reducing agent.

Figure 2:
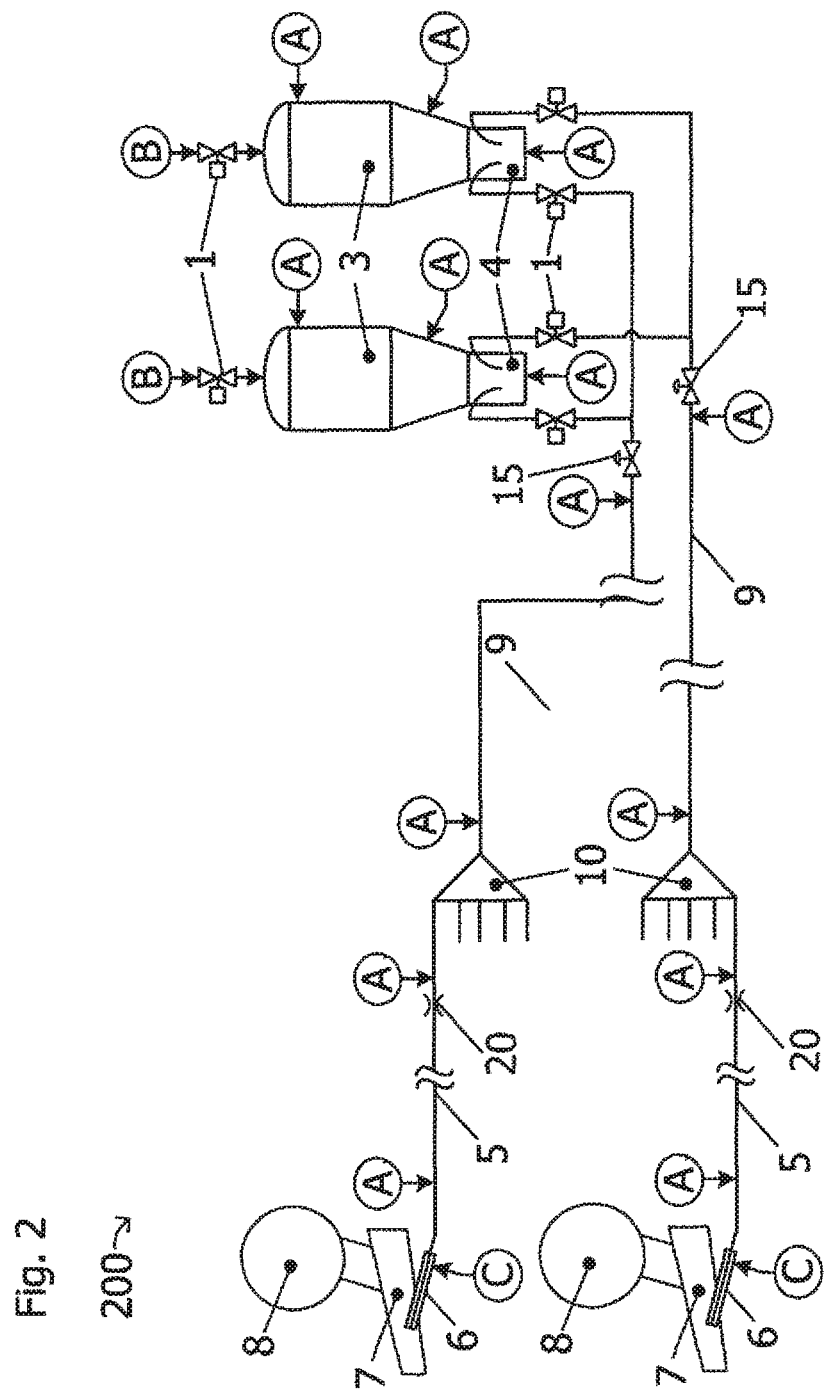
FIG. 2 shows a further preferred injection plant which has a static distributor.

FIG. 2 shows an alternative embodiment of an injection plant 200.

In contrast to the injection plant in FIG. 1a, FIG. 2 shows an injection plant 200 without a separate pressure lock. Such a separate pressure lock may however also be provided in the embodiment according to FIG. 2. In the injection system 200, in particular two separate injection vessels 3 are provided, wherein more than two injection vessels 3 may also be present. From the injection vessels 3, the substitute reducing agent and transport gas enter a pipe system via a respective fluidization vessel 4, as in the embodiment in FIG. 1a.

The injection plant 200 comprises for example two collective transport lines 9. In principle, a single collective transport line 9 may also be provided, or more than two collective transport lines 9. Through the collective transport lines 9, the substitute reducing agent and transport gas from the fluidization vessel 4 reach a static distributor 10, in which they are distributed over several individual transport lines 5. The individual transport lines 5 then each lead to an injection lance 6, wherein this injection plant 200 too may be configured and modified as described in connection with FIG. 1.

Preferably, the individual transport lines 5 each comprise a choke 20 in order to be able to adjust reliably the distribution of the substitute reducing agent to be injected. Alternatively and additionally, the individual transport lines 5 may also be equipped with control valves.

Particularly preferably, the fuel gas is added to the transport gas at the points marked "A" on the individual transport lines 5. In principle however, it is also possible that fuel gas is supplied upstream of these points, namely for example in the region of the collective transport lines 9, or directly to the injection vessels 3. For safety reasons however, it is preferred that the fuel gas is supplied to the transport gas as far downstream as possible. In particular, in this way the risk of explosion of the injection plant can be kept very low.

Figure 3:
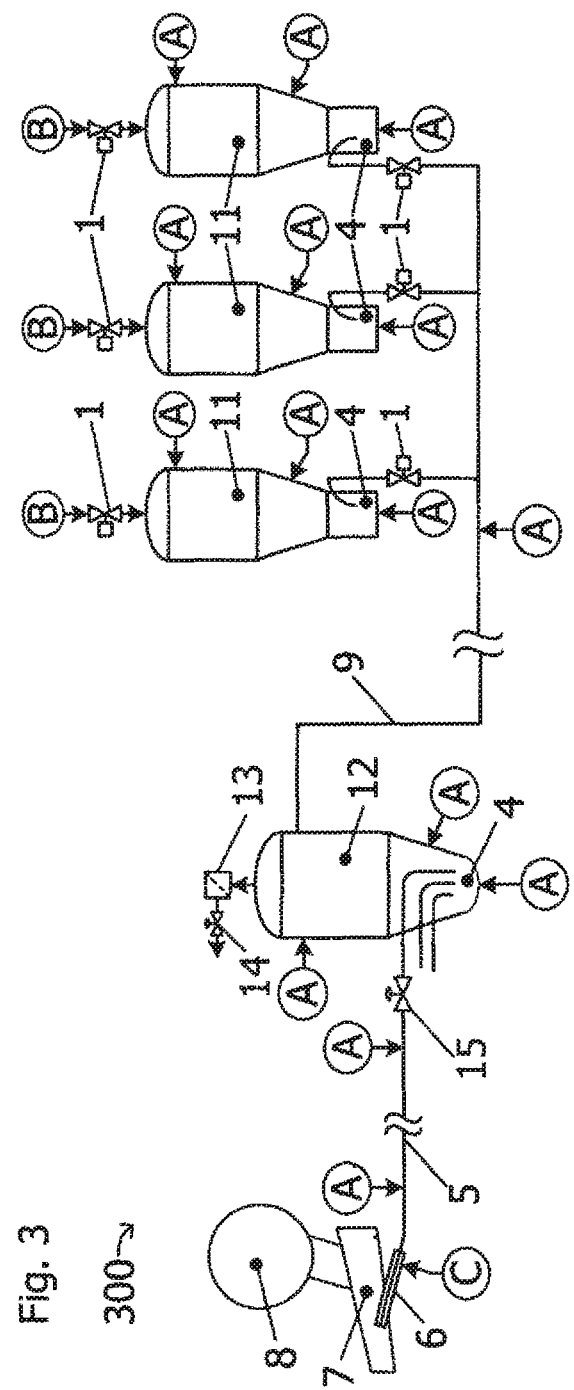
FIG. 3 shows a further preferred injection plant which has a distribution vessel instead of a static distributor.

FIG. 3 shows a further preferred embodiment of an injection plant 300, wherein the injection plant 300 according to FIG. 3 has three intermediate transport vessels 11 instead of the injection vessels 3 of the two embodiments described above.

From the intermediate transport vessels 11, the substitute reducing agent and transport gas reach a distribution vessel 12 via a collective transport line 9. From the distribution vessel 12, via a fluidization vessel 4 in the same way as in the embodiments described above, substitute reducing agent with transport gas may be conducted via an individual transport line 5 to the injection lance 6 for injection into the tuyere 7. Instead of the injection lance 6, in this embodiment too, other mechanisms may be used for blowing the substitute reducing agent into the tuyere 7.

From the distribution vessel 12, via a gas control valve 14 mounted downstream of a filter 13, surplus gas may be discharged to the environment. Also, the third preferred embodiment of the injection plant 300 contains some valves, in particular shut-off valves 1 and dust control valves 15, in order to be able to control the flow of the substitute reducing agent and transport gas reliably. For the sake of completeness, it is stated that such valves, in particular the dust control valves 15, may be provided on the individual transport lines 5 and also on the collective transport line 9 or lines 9. In connection with the present invention, no particular requirements are imposed on the arrangement and configuration of valves, vessels and similar components, nor on the configuration of the gas transport system, but these result from the professional design of the injection plant as known in principle.

In the embodiment shown in FIG. 3, the fuel gas is also supplied to the transport gas particularly preferably at the points marked "A" on the individual transport line 5. In the same way as in the embodiments described above according to FIGS. 1 and 2, it is however also possible to acid the fuel gas to the system at other points. For example, in FIG. 3, various points are marked "A" at which the fuel gas may be added to the system.

The embodiments described above show three exemplary possibilities for how the method according to the invention may be implemented in terms of the plant. The invention is not however restricted to these particular embodiments of an injection plant but may also be used in different types of device.

In particular, the embodiment of the injection lance(s) may be selected individually for each injection plant and combined, wherein the exemplary embodiments illustrated in connection with FIG. 1 may evidently also be used in the embodiments shown in FIGS. 2 and 3 and may be combined arbitrarily.

Using the injection plants described above, the method according to the invention may be applied well. In this way it is possible to achieve substantial savings in fuel costs in the blast furnace process or gasification reactors, in that a larger quantity of substitute reducing agent is injected into the blast furnace or reactor than is possible with the methods according to the prior art, because the gasification reaction according to the invention can proceed more quickly and begin earlier.

The invention claimed is:

1. A method for pneumatically blowing a powdery substitute reducing agent in a dense flow process, in which a flow density of the powdery substitute reducing agent is 60% or more of the packing density in the bulk state, by means of a transport gas, into a reactor or via a tuyere into a blast furnace, so that the substitute reducing agent is gasified in a gasification reaction, wherein the transport gas comprises a fuel gas, which is carbon monoxide, hydrogen, water vapor, oxygen, hydrocarbon, furnace gas, natural gas, coke gas or coking plant gas, converter gas, another blast furnace gas, or a mixture thereof.

2. A method according to claim 1, wherein at least 2 w. % of the transport gas is the fuel gas.

3. A method according to claim 1, wherein the substitute reducing agent is injected with the transport gas through a first injection lance, and
wherein the first injection lance protrudes into the tuyere.

4. A method according to claim 3, wherein in addition to the substitute reducing agent and transport gas, oxygen is also supplied to the reactor through the first injection lance and is combined with the substitute reducing agent and transport gas in an opening region of the first injection lance,
wherein the first injection lance has an inner first pipe and a second pipe arranged around the inner first pipe, whereby a ring gap surrounding the first pipe is formed between the first and second pipes, and
wherein the substitute reducing agent and the transport gas are conducted through the first pipe and the oxygen is conducted through the ring gap.

5. A method according to claim 4, wherein at least one of the substitute reducing agent with the fuel gas and the oxygen is conducted through at least one first injection lance and at least one second injection lance into the reactor via the tuyere.

6. A method according to claim 4, wherein at least one of an outlet speed and the quantity of oxygen is adjusted depending on the reaction.

7. A method according to claim 3, wherein the first injection lance is a single pipe and wherein oxygen is conducted through a second injection lance into the reactor via the tuyere into the blast furnace.

8. A method according to claim 1, wherein a mixing of the substitute reducing agent and transport gas with oxygen is promoted by an eddy structure.

9. A method according to claim 1, wherein at least one of an outlet speed, an injection quantity of the substitute reducing agent and transport gas, and a ratio between the substitute reducing agent and fuel gas, is adjusted depending on the reaction.

10. A method according to claim 1, wherein at least one of the transport gas, and the substitute reducing agent has a temperature of between 100° C. and 950° C.

11. A method according to claim 1, wherein at least 5 w. % of the transport gas is the fuel gas.

12. A method according to claim 1, wherein at least 10 w. % of the transport gas is the fuel gas.

13. A method according to claim 1, wherein a maximum of 90 w. % of the transport gas is the fuel gas.

14. A method according to claim 1, wherein a maximum of 50 w. % of the transport gas is the fuel gas.

15. A method according to claim 1, wherein a maximum of 25 w. % of the transport gas is the fuel gas.

16. A method according to claim 1, wherein a maximum of 20 w. % of the transport gas is the fuel gas.

17. A method for pneumatically blowing a powdery substitute reducing agent in a dense flow process, in which a flow density of the powdery substitute reducing agent is 60% or more of the packing density in the bulk state, by means of a transport gas, into a reactor, or via a tuyere into a blast furnace, so that the substitute reducing agent is gasified in a gasification reaction,
wherein the transport gas consists of a fuel gas, the components of which or their oxidation components at least partially participate in the gasification reaction, and of another gas or gas mixture than the fuel gas.

18. A method according to claim 17, wherein the another gas comprises nitrogen.

19. A method according to claim 17, wherein the fuel gas consists of carbon monoxide, carbon dioxide, hydrogen, water vapor, oxygen, hydrocarbon, or a mixture thereof.

20. A method for pneumatically blowing a powdery substitute reducing agent in a dense flow process, in which a flow density of the powdery substitute reducing agent is 60% or more of the packing density in the bulk state, by means of a transport gas, into a reactor or via a tuyere into a blast furnace, so that the substitute reducing agent is gasified in a gasification reaction,
wherein the substitute reducing agent with the transport gas is blown in through a first injection lance,
wherein in addition to the substitute reducing agent and transport gas, oxygen is also supplied to the reactor through the first injection lance and is combined with the substitute reducing agent and transport gas in an opening region of the first injection lance,
wherein the first injection lance has an inner first pipe and a second pipe arranged around the inner first pipe, whereby a ring gap surrounding the first pipe is formed between the first and second pipes, wherein the substitute reducing agent and the transport gas are conducted through the first pipe and the oxygen is conducted through the ring gap, and
wherein the transport gas comprises a fuel gas, the components of which or their oxidation components participate at least partially in the gasification reaction.

* * * * *